(12) United States Patent
Shibata

(10) Patent No.: US 9,866,855 B2
(45) Date of Patent: Jan. 9, 2018

(54) PROCESSING CONTROL DEVICE, PROCESSING CONTROL METHOD, AND PROCESSING CONTROL PROGRAM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 14/913,504

(22) PCT Filed: Aug. 28, 2014

(86) PCT No.: PCT/JP2014/004430
§ 371 (c)(1),
(2) Date: Feb. 22, 2016

(87) PCT Pub. No.: WO2015/045276
PCT Pub. Date: Apr. 2, 2015

(65) Prior Publication Data
US 2016/0205408 A1   Jul. 14, 2016

(30) Foreign Application Priority Data

Sep. 30, 2013   (JP) .................. 2013-204865

(51) Int. Cl.
H04N 19/42      (2014.01)
H04N 19/436     (2014.01)
(Continued)

(52) U.S. Cl.
CPC ......... *H04N 19/436* (2014.11); *H04N 19/115* (2014.11); *H04N 19/42* (2014.11);
(Continued)

(58) Field of Classification Search
CPC .... H04N 19/436; H04N 19/42; H04N 19/503; H04N 19/61; H04N 19/70; H04N 19/96; H04N 19/115; H04N 19/593
(Continued)

(56) References Cited

U.S. PATENT DOCUMENTS

| 7,881,542 B2 | 2/2011 | Kashima et al. |
| 2006/0093043 A1 | 5/2006 | Kashima et al. |
| 2010/0091881 A1 | 4/2010 | Pandit et al. |

FOREIGN PATENT DOCUMENTS

| JP | 2006-129285 | 5/2006 |
| JP | 2008-283612 | 11/2008 |

(Continued)

OTHER PUBLICATIONS

International Search Report, PCT/JP2014/004430, dated Nov. 4, 2014.
(Continued)

*Primary Examiner* — Nguyen Truong
(74) *Attorney, Agent, or Firm* — Young & Thompson

(57) ABSTRACT

A processing control device includes: a process completion map 21 which is a map corresponding to processing units of respective sizes, and in which, when process corresponding thereto is completed, setting indicating completion of the process is performed; a dependence dissolution map 23 which is a map corresponding to the processing units of the respective sizes and in which information indicating that the dependence of each process disappears is set; a controller 10 which, when the process is completed, sets information indicating that the process is completed in an area corresponding to the process within a small size of map in the process completion map 21; and a reflecting circuit 22 which reflects the information set in the process completion map 21 in the dependence dissolution map 23.

20 Claims, 10 Drawing Sheets

(51) Int. Cl.
- *H04N 19/115* (2014.01)
- *H04N 19/503* (2014.01)
- *H04N 19/593* (2014.01)
- *H04N 19/61* (2014.01)
- *H04N 19/70* (2014.01)
- *H04N 19/96* (2014.01)

(52) U.S. Cl.
 CPC ......... *H04N 19/503* (2014.11); *H04N 19/593* (2014.11); *H04N 19/61* (2014.11); *H04N 19/70* (2014.11); *H04N 19/96* (2014.11)

(58) Field of Classification Search
 USPC .................................................. 375/240.13
 See application file for complete search history.

(56) References Cited

FOREIGN PATENT DOCUMENTS

| JP | 2010-514353 | 4/2010 |
|---|---|---|
| WO | WO 2008/114367 | 9/2008 |

OTHER PUBLICATIONS

ITU-T Recommendation H.265 High efficiency video coding, Apr. 2013.

FIG. 11
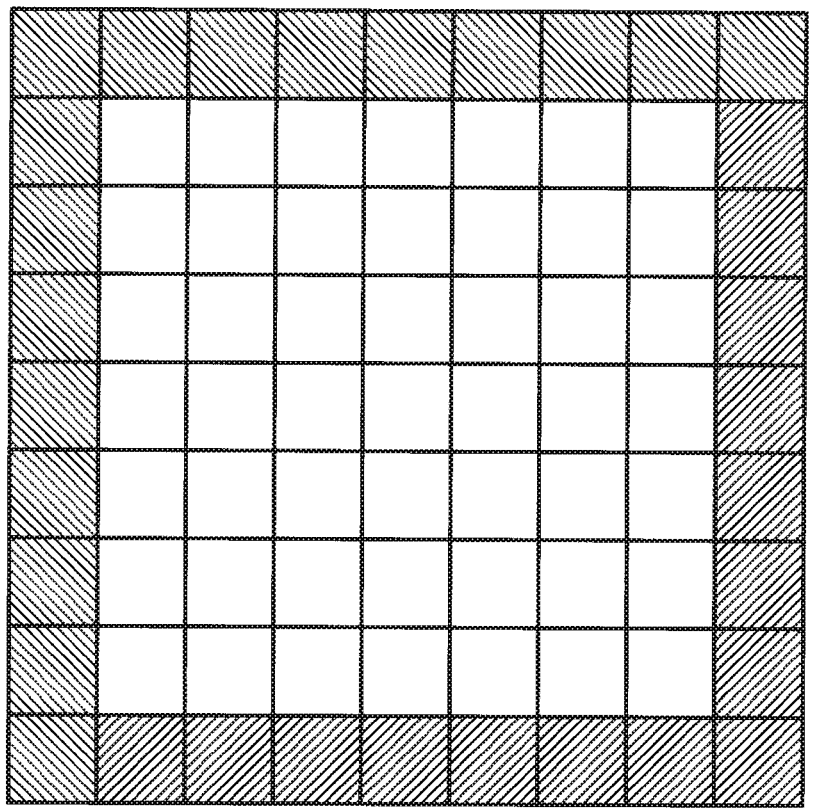
 : REFERENCE IMAGE
 : IMAGE REFERENCED IN NEXT IMAGE BLOCK

PROCESSING CONTROL DEVICE, PROCESSING CONTROL METHOD, AND PROCESSING CONTROL PROGRAM

TECHNICAL FIELD

The present invention relates to a processing control device, a processing control method, and a processing control program for determining that dependence of one process with the other process disappears.

BACKGROUND ART

Non Patent Literature (NPL) 1 describes High Efficiency Video Coding (HEVC) which is a video coding scheme based on the ITU-T Recommendation H.265 standard.

In HEVC, each frame of digitized video is divided into coding tree units (CTUs) and the respective CTUs are encoded in the order of raster scan. Each CTU is divided into coding units (CUs) in the quad-tree structure and encoded. Each CU is divided into prediction units (PUs) before prediction. Moreover, a prediction error of each CU is divided into transform units (TUs) in the quad-tree structure and frequency-transformed. The largest size of CU and the minimum size of CU are referred to as a largest coding unit (LCU) and a smallest coding unit (SCU), respectively.

The CU is predictively encoded by intra prediction or inter frame prediction (inter prediction).

FIG. 7 is an explanatory diagram illustrating a CU division example in the case where the CTU size is 64×64 (64 pixels×64 pixels). (A) of FIG. 7 illustrates an example of a partitioning shape (hereinafter, also referred to as "block structure") and (B) of FIG. 7 illustrates a CU quad-tree structure corresponding to the partitioning shape illustrated in (A) of FIG. 7.

Moreover, the CU is divided into TUs in the quad-tree structure. The way of division is the same as in the case of the CU division illustrated in (A) of FIG. 7. The layer (depth) illustrated in (B) of FIG. 7 is derived by focusing on the TU division.

When the division is performed in the case of coding by the intra prediction, TUs are sequentially divided with the PU, which is a block obtained by dividing the CU into four parts, as a starting point. In the case of coding by the inter prediction, TUs are sequentially divided with the CU as a starting point.

Referring to FIG. 8, the following describes the configuration and the operation of a general video coding device which outputs a bit stream with each CU of each frame of the digitized video as an input image.

FIG. 8 is a block diagram illustrating an example of a general video coding device. The video coding device illustrated in FIG. 8 includes a transformer 301, a quantizer 302, an entropy encoder 303, an inverse quantizer/inverse transformer 304, a buffer 305, a prediction unit 306, and an optimal prediction mode decision unit 307.

The optimal prediction mode decision unit 307 decides a CU quad-tree structure, a PU partitioning shape, and a TU quad-tree structure so as to obtain high coding efficiency in accordance with the features of the image for each CTU.

The prediction unit 306 generates a prediction signal for the input image signal of the CU on the basis of the CU quad-tree structure and the PU partitioning shape decided by the optimal prediction mode decision unit 307. The prediction signal is generated on the basis of the intra prediction or the inter prediction.

The transformer 301 frequency-transforms a prediction error image (prediction error signal) obtained by subtracting a prediction signal from the input image signal on the basis of the TU quad-tree structure decided by the optimal prediction mode decision unit 307. The transformer 301 uses orthogonal transform of block size 4×4, 8×8, 16×16, or 32×32 based on the frequency transform in the transform coding of the prediction error signal. Specifically, discrete sine transform (DST) approximated in integer arithmetic (of integer precision) is used for the 4×4 TU of a luminance component of an intra-encoded or inter-encoded CU. For other TUs, discrete cosine transform (DCT) approximated in integer arithmetic (of integer precision) corresponding to the block size is used.

Hereinafter, the discrete cosine transforming and the discrete sine transforming performed by the transformer 301 will be collectively referred to as "orthogonal transforming."

The quantizer 302 quantizes a transform coefficient (orthogonal transform coefficient) supplied from the transformer 301. The inverse quantizer/inverse transformer 304 inversely quantizes the transform coefficient. Furthermore, the inverse quantizer/inverse transformer 304 inversely transforms the inversely-quantized transform coefficient. The inversely-transformed prediction error image is supplied to the buffer 305 with the prediction signal added. The buffer 305 stores the image as a reference image.

CITATION LIST

Patent Literature

PTL 1: PCT Patent Applications Publication No. 2008/114367

Non Patent Literature

NPL 1: ITU-T Recommendation H.265 High efficiency video coding, April 2013

SUMMARY OF INVENTION

Technical Problem

FIG. 9 is an explanatory diagram for describing dependence. As illustrated in (A) of FIG. 9, the following respective processes are performed in the coding process: prediction image generation (by a prediction unit 306 illustrated in FIG. 8), prediction error (also referred to as "residual") generation (by a subtractor illustrated in FIG. 8), orthogonal transform (by a transformer 301 illustrated in FIG. 8), quantization (by a quantizer 302 illustrated in FIG. 8), inverse quantizer (by an inverse quantizer/inverse transformer 304 illustrated in FIG. 8), inverse orthogonal transform (by an inverse quantizer/inverse transformer 304 illustrated in FIG. 8), and image reconstruction (by an adder illustrated in FIG. 8). Incidentally, the reconstructed image is stored in a buffer 305 illustrated in FIG. 8.

The intra prediction is prediction for generating a prediction image from a reference image of a coding target frame. NPL 1 defines 33 types of angular intra prediction illustrated in FIG. 10. In the angular intra prediction, intra prediction signals (prediction pixels) are generated by extrapolating reference pixels around the coding target block in any of the 33 directions illustrated in FIG. 10. In addition to the 33 types of angular intra prediction, NPL 1 defines DC intra prediction for averaging the reference pixels around the coding target block and planar intra prediction for performing linear interpolation of the reference pixels around the coding target block.

In FIG. 10, respective rectangles in the top row and respective rectangles in the leftmost column represent reference pixels. A numeral in each rectangle indicates a coordinate. An arrow indicates a prediction direction. A numeral added near the arrow indicates a prediction mode (hereinafter, also referred to as "mode").

FIG. 11 is an explanatory diagram illustrating adjacent blocks adjacent to a prediction target block (prediction block). In the adjacent blocks (8×8 in the example illustrated in FIG. 11), the pixels located at the right end and at the lower end are reference pixels of the prediction block. Therefore, unless these pixels are stored in the buffer 305, coding of the prediction block cannot be started. Hereinafter, this is referred to as that the prediction block has a "dependence" with the adjacent blocks.

The prediction block has the dependence with the adjacent blocks and therefore, for example, top-left four blocks (four 16×16 blocks) in (A) of FIG. 7 are not allowed to be intra-encoded simultaneously.

As a result, the above four blocks are not allowed to be processed simultaneously in the subsequent process (process in the part enclosed by a dashed line in FIG. 8), either.

Specifically, as illustrated in (B) of FIG. 9, unless an image as a reference image is reconstructed, the subsequent prediction image generating process cannot be started. In other words, unless the dependence is dissolved, the subsequent prediction image generating process cannot be started.

In HEVC, the adjacent blocks are processed in Z-order (Z scan). The completion of process of a certain block, however, enables the process of a plurality of blocks in some cases. For example, upon completion of the process of a block (a) illustrated in (A) of FIG. 7, a process of a block (c) is allowed to be started in addition to a block (b). Therefore, if the dissolution of the dependence (a fact that the process is enabled to be started) can be rapidly detected, the process of the block (b) and the process of the block (c) can be started in parallel earlier, thereby increasing the effect of the parallel processing.

Therefore, to increase the speed of the coding process, it is preferable to start the process of one block immediately after dependence of the block with the other block disappears.

PTL 1 describes a system which uses dependence specification unit where data indicating dependence between a plurality of blocks is set. Upon the completion of the process of a certain block in the system, data of the completion of the process is set with respect to the block in the dependence specification unit and data indicating that the process is executable with respect to the block for which process is made possible is set.

In PTL 1, the dependence between a block and a picture (composed of a plurality of blocks) is also set in the dependence specification unit, thereby enhancing the effect of the parallel processing of respective portions constituting a coding device or a decoding device.

The control using such a dependence specification unit is complicated, however, and in the case of mounting the coding device or the decoding device for treating the blocks of the plurality of sizes (see (A) of FIG. 7) on the image processing device or the like, it is desired to construct dependence control that can be performed more easily and rapidly.

Therefore, it is an object of the present invention to provide a processing control device, a processing control method, and a processing control program capable of performing simple and rapid dependence control.

Solution to Problem

According to the present invention, there is provided a processing control device for determining that dependence of one process with the other process disappears, wherein: the process is performed with any one of processing units of a plurality of sizes as a unit; and a processing unit of a small size among the processing units of the plurality of sizes is included in a processing unit of a large size, the processing control device including: a process completion map which is a map corresponding to processing units of the respective sizes, and in which, when the process corresponding thereto is completed, setting indicating completion of the process is performed; a dependence dissolution map which includes maps corresponding to the processing units of the respective sizes and in which information indicating that the dependence of each process disappears is set; a controller which, when the process is completed, sets information indicating that the process is completed in an area corresponding to the process within the small size of map in the process completion map; and a reflecting circuit which reflects the information set in the process completion map in the dependence dissolution map.

According to the present invention, there is provided a processing control method for determining that dependence of one process with the other process disappears, wherein: the process is performed with any one of processing units of a plurality of sizes as a unit; a processing unit of a small size among the processing units of the plurality of sizes is included in a processing unit of a large size; when one process is completed, information indicating that the process is completed is set in an area corresponding to the process within the small size of map in the process completion map corresponding to the processing units of the respective sizes; and the information set in the process completion map is reflected on the dependence dissolution map which includes maps corresponding to the processing units of the respective sizes and in which information indicating that the dependence of each process disappears is set.

According to the present invention, there is provided a processing control program causing a computer to perform: setting information indicating that one process is completed in an area corresponding to the process within a small size of map in a process completion map corresponding to processing units of respective sizes when the process is completed; and reflecting the information set in the process completion map on the dependence dissolution map which includes maps corresponding to the processing units of the respective sizes and in which information indicating that the dependence of each processing disappears is set.

Advantageous Effects of Invention

According to the present invention, simple and rapid dependence control can be performed.

BRIEF DESCRIPTION OF DRAWINGS

FIG. 11 is an explanatory diagram illustrating adjacent blocks adjacent to a prediction block.

DESCRIPTION OF EMBODIMENT

Figure 1:
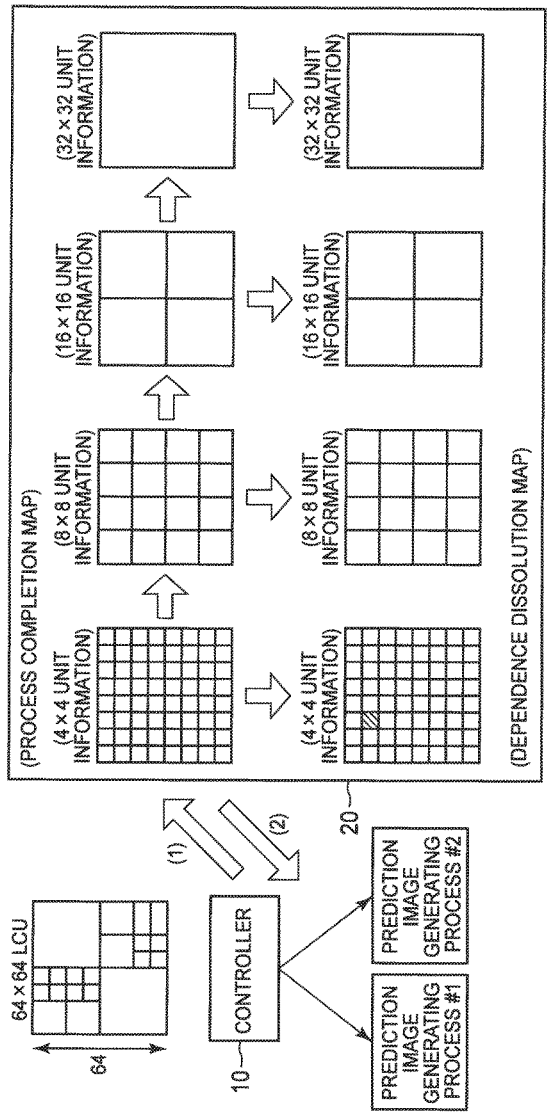
FIG. 1 is a conceptual diagram illustrating a processing control method according to the present invention.

FIG. 1 is a conceptual diagram illustrating a processing control method according to the present invention. FIG. 1 illustrates an example of a 64×64 LCU, a controller 10, and a mapping unit 20. The mapping unit 20 includes a process completion map and a dependence dissolution map. Incidentally, FIG. 1 illustrates an example with the 32×32 TU (there is no 64×64 map) focused on.

The process completion map includes a 4×4 unit information map, an 8×8 unit information map, a 16×16 unit information map, and a 32×32 unit information map.

In the process completion map, data corresponding to each of 64×4 units (16 pixels) included in the 32×32 block is set in the 4×4 unit information map. In the 8×8 unit information map, data corresponding to each of 16 8×8 units (64 pixels) included in the 32×32 block is set. In the 16×16 unit information map, data corresponding to each of four 16×16 units (256 pixels) included in the 32×32 block is set. In the 32×32 unit information map, data corresponding to each of four 32×32 units (1024 pixels) included in the 64×64 LCU is set.

In the 4×4 unit information map, data corresponding to each of 64 4×4 units (one unit includes 16 pixels) included in the 32×32 block is set. In the 8×8 unit information map, data corresponding to each of 16 8×8 units (one unit includes 64 pixels) included in the 32×32 block is set. In the 16×16 unit information map, data corresponding to each of four 16×16 units (one unit includes 256 pixels) included in the 32×32 block is set. In the 32×32 unit information map, data corresponding to each of four 32×32 units (one unit includes 1024 pixels) included in the 64×64 LCU is set. Note that the term "N×N unit" (N: 4, 8, 16, or 32) does not mean N×N units, but means a single unit that includes N×N pixels.

Upon the completion of the process of the corresponding block in each unit information map, "1" is set.

The dependence dissolution map includes a 4×4 unit information map, an 8×8 unit information map, a 16×16 unit information map, and a 32×32 unit information map. Incidentally, in the dependence dissolution map, the shaded area indicates that the corresponding area is a target for the dependence dissolution, for example.

In the dependence dissolution map, when the process of a corresponding block can be started in each unit information map, "1" is set.

The controller 10 initializes all data in each unit information map in the process completion map to zero at a predetermined time. Thereafter, upon the completion of the process of the TU in the prediction image generating process #1, "1" is set to data at a corresponding location in the 4×4 unit information map of the corresponding process completion map. If "1" is set at a plurality of predetermined locations in the 4×4 unit information map, "1" is set to data at predetermined locations in the dependence dissolution map.

When there is a location where "1" is set in the dependence dissolution map, the controller 10 causes a processing unit (not illustrated in FIG. 1) to start the process of TU in the prediction image generating process #2 corresponding to the location.

Moreover, in the 4×4 unit information map of the process completion map, when "1" is set at four locations included in one location of the 8×8 unit information map, "1" is set at the corresponding location in the 8×8 unit information map. Similarly, in the 8×8 unit information map, when "1" is set at four locations included in one location in the 16×16 unit information map, "1" is set at the corresponding location in the 16×16 unit information map. Furthermore, in the 16×16 unit information map, when "1" is set at four locations included in one location in the 32×32 unit information map, "1" is set at the corresponding location in the 32×32 unit information map.

Figure 2:
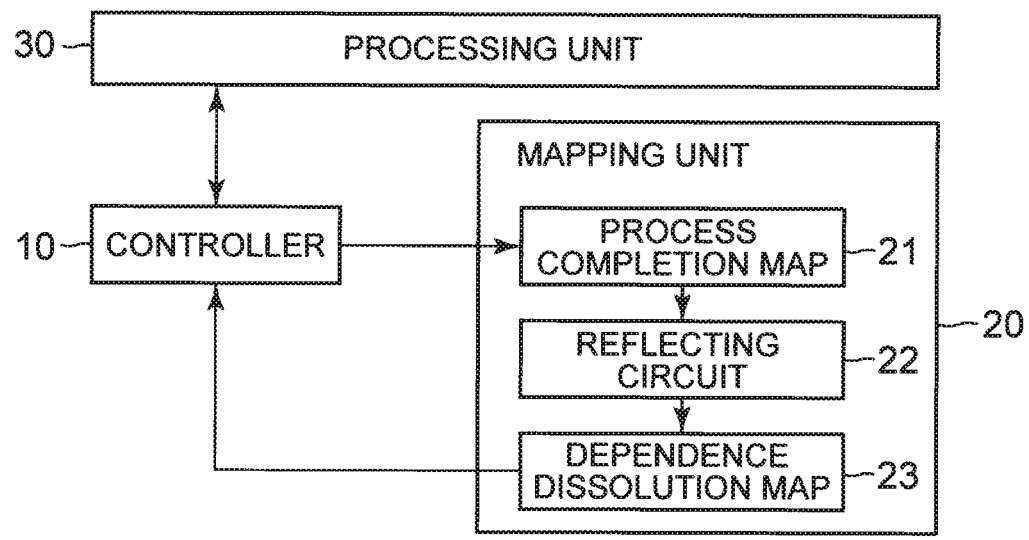
FIG. 2 is a block diagram illustrating one exemplary embodiment of a processing control circuit along with a processing unit.

FIG. 2 is a block diagram illustrating one exemplary embodiment of a processing control circuit along with the processing unit. In the configuration illustrated in FIG. 2, the processing control circuit includes the controller 10 and the mapping unit 20. The mapping unit 20 includes a process completion map 21, a reflecting circuit 22, and a dependence dissolution map 23.

Figure 8:
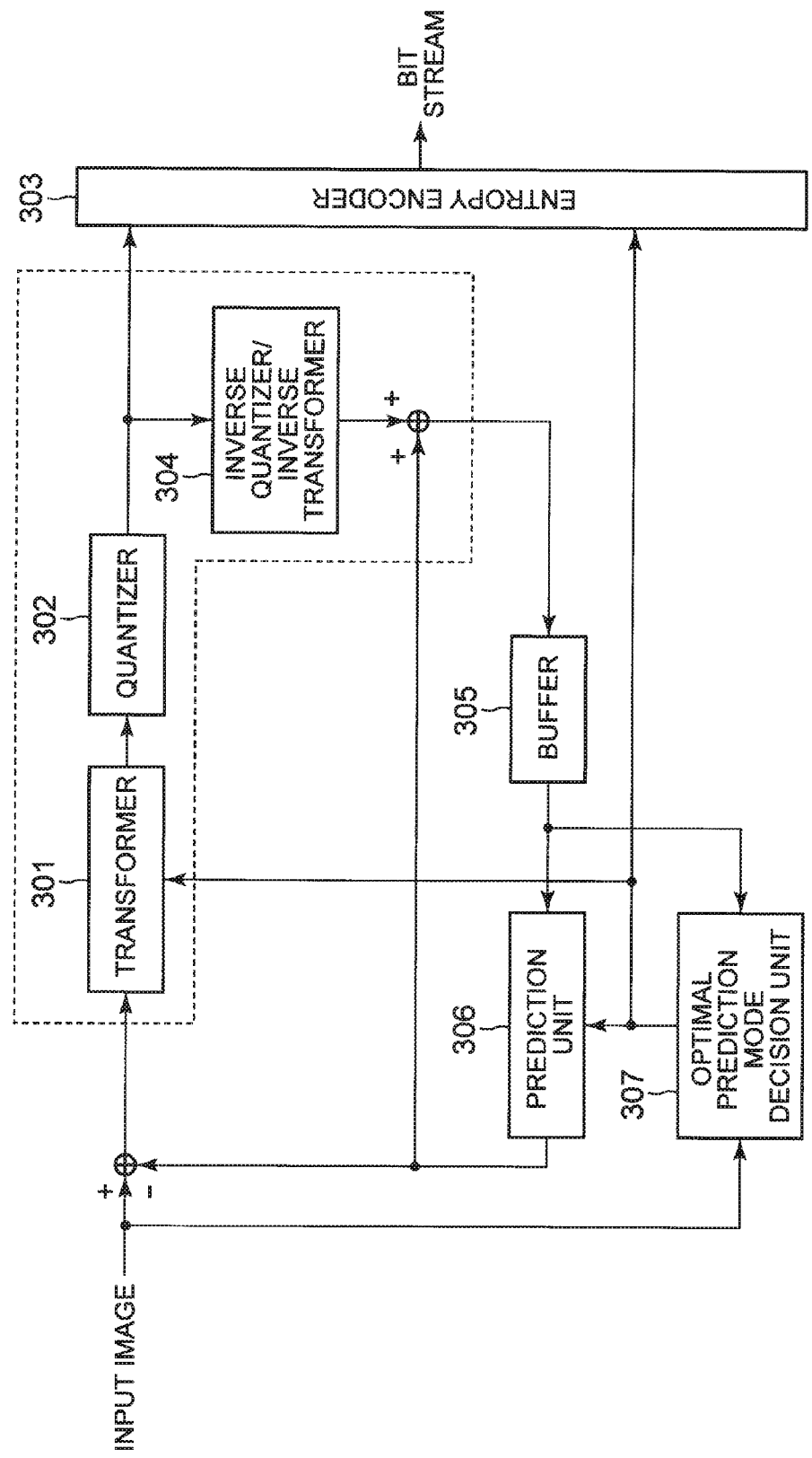
FIG. 8 is an explanatory diagram illustrating the configuration of a general video coding device.
Figure 9:
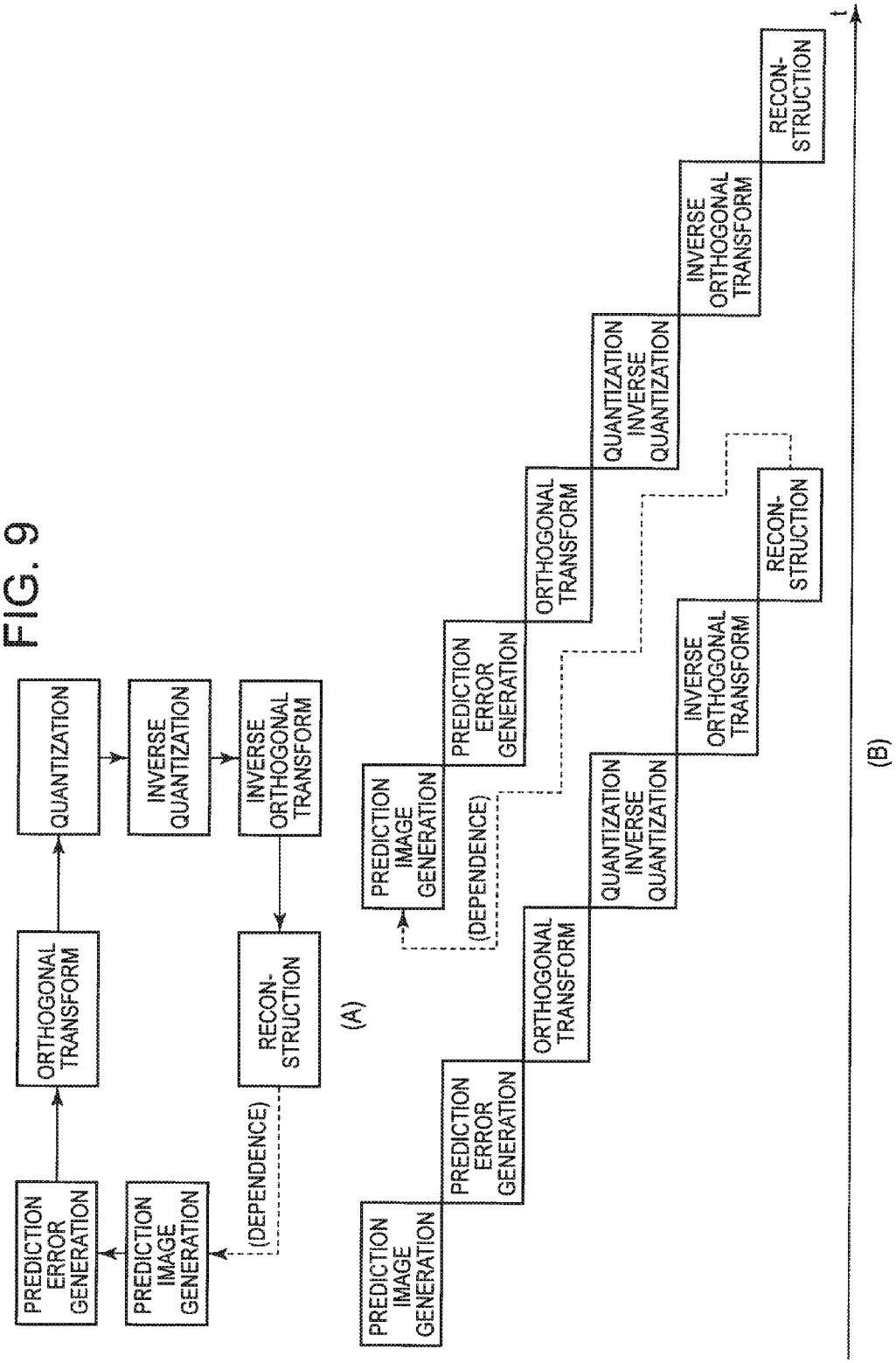
FIG. 9 is an explanatory diagram for describing dependence.
Figure 10:
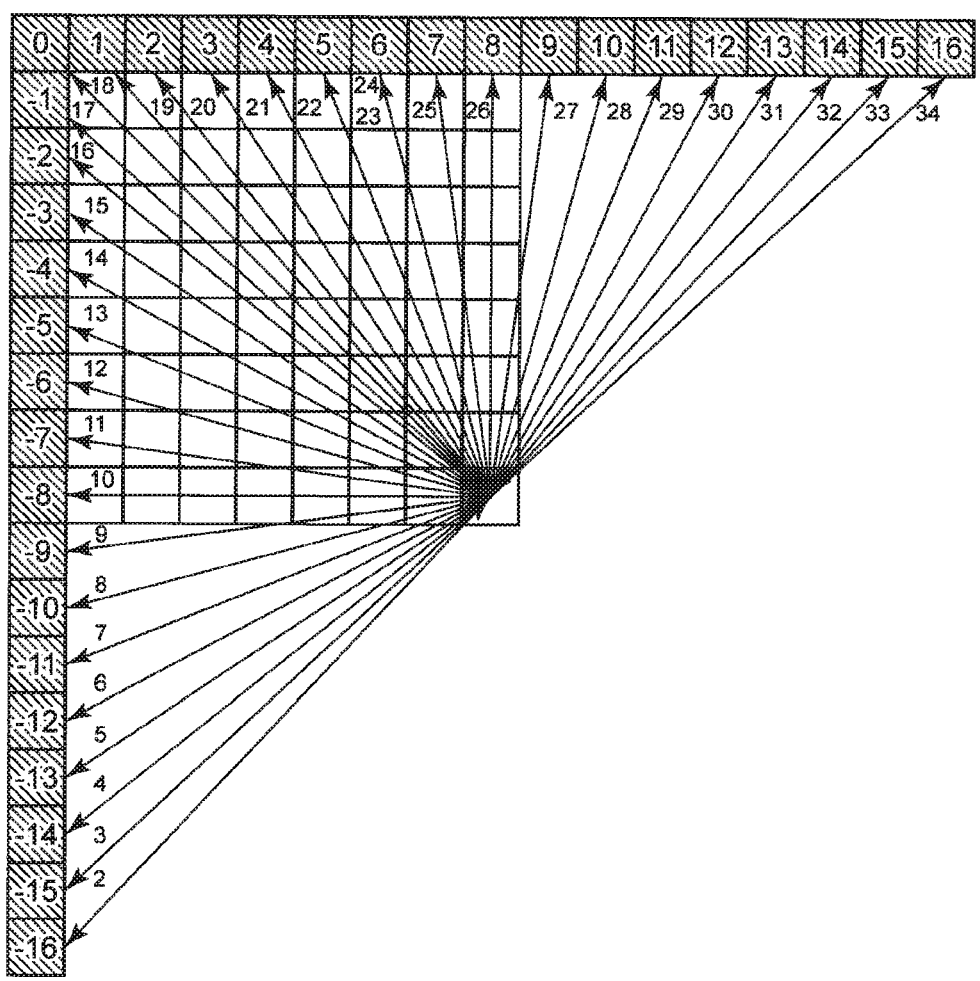
FIG. 10 is an explanatory diagram illustrating an example of 33 types of angular intra prediction.

The processing control circuit is applicable to a video coding device illustrated in FIG. 8, for example. In that case, the processing unit 30 is placed, for example, in units having functions of a transformer 301, a quantizer 302, an inverse quantizer/inverse transformer 304, and a subtractor. The processing unit 30 has circuits of a plurality of systems for implementing these functions. Specifically, the processing unit 30 has transformers 301 of a plurality of systems, a quantizer 302, an inverse quantizer/inverse transformer 304, and a subtractor, so that a plurality of processes are able to be performed in parallel.

Figure 3:
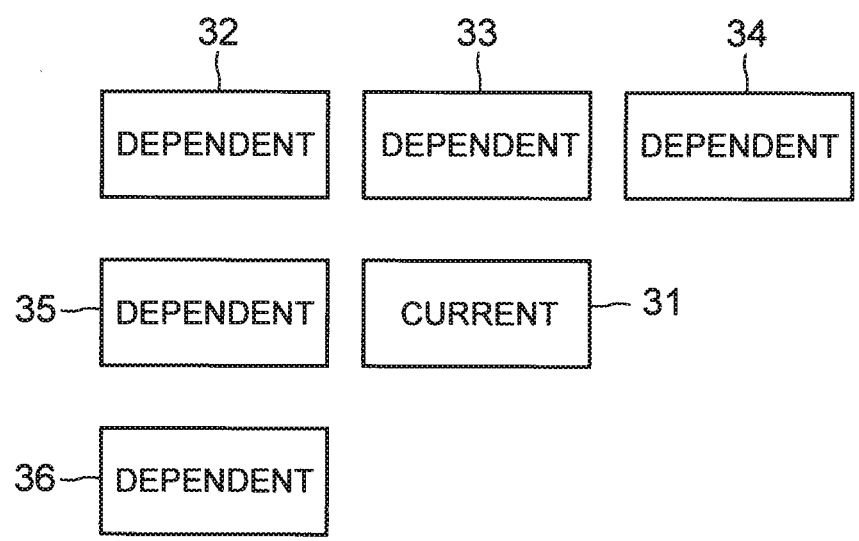
FIG. 3 is an explanatory diagram illustrating an example of dependence between blocks.

FIG. 3 is an explanatory diagram illustrating an example of dependence between blocks. If the block is a TU, five blocks 32 to 36 around the prediction block (prediction target block) 31 are blocks having the "dependence."

Figure 4:
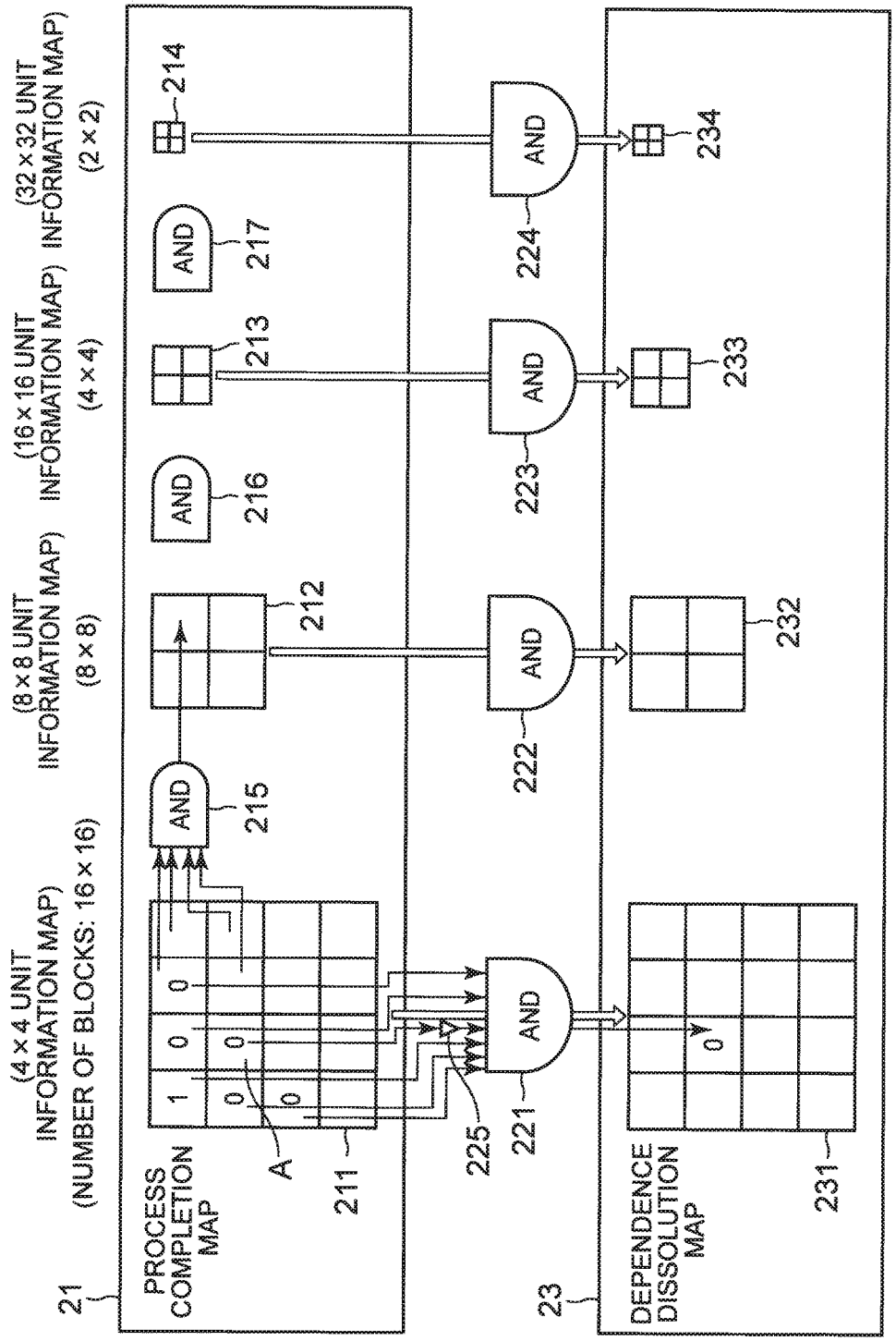
FIG. 4 is an explanatory diagram for describing the configuration of a mapping unit.

FIG. 4 is an explanatory diagram for describing the configuration of the mapping unit 20. FIG. 4 illustrates a configuration for a case where the maximum block size is 64×64. Therefore, in the process completion map 21, the 4×4 unit information map 211 has 16×16 areas. The 8×8 unit information map 212 has 8×8 areas. The 16×16 unit information map 213 has 4×4 areas. The 32×32 unit information map 214 has 2×2 areas. Note that, however, in FIG. 4, all areas are not illustrated, but some areas are illustrated.

In the process completion map 21, there is provided an AND circuit 215 provided so that an input is data of four areas included in one area of the 8×8 unit information map 212 in the 4×4 unit information map 211 and an output is set in the area of the 8×8 unit information map 212. Although only the single AND circuit 215 is illustrated in FIG. 4, actually AND circuits corresponding to all areas of the 8×8 unit information map 212 are provided.

Incidentally, the term "an AND circuit 'inputs data'" means that a logical level "1" or "0" of "data" is input to the AND circuit.

Furthermore, in the process completion map 21, there is provided an AND circuit 216 provided so that an input is data of four areas included in one area of the 16×16 unit information map 213 in the 8×8 unit information map 212 and an output is set in the area of the 16×16 unit information map 213. Although only the single AND circuit 216 is illustrated in FIG. 4, actually AND circuits corresponding to all areas of the 16×16 unit information map 213 are provided.

Furthermore, in the process completion map 21, there is provided an AND circuit 217 provided so that an input is data of four areas included in one area of the 32×32 unit information map 214 in the 16×16 unit information map 213 and an output is set in the area of the 32×32 unit information map 214. Although only the single AND circuit 217 is illustrated in FIG. 4, actually AND circuits corresponding to all areas of the 32×32 unit information map 214 are provided.

Since the AND circuit 215 is provided, the controller 10 does not set data in the 8×8 unit information map 212. It is because data is automatically set in the 8×8 unit information map 212 on the basis of the data set in the 4×4 unit information map 211.

Similarly, the AND circuit 216 causes data to be automatically set in the 16×16 unit information map 213 on the basis of the data set in the 8×8 unit information map 212.

Moreover, the AND circuit 217 causes data to be automatically set in the 32×32 unit information map 214 on the basis of the data set in the 16×16 unit information map 213.

Incidentally, for example, a register is used as an area where data in the mapping unit 20 is set (an area where data in the process completion map 21 and in the dependence dissolution map 23 is set).

Moreover, the dependence dissolution map 23 also includes a 4×4 unit information map 231, an 8×8 unit information map 232, a 16×16 unit information map 233, and a 32×32 unit information map 234. The 4×4 unit information map 231 has 16×16 areas. The 8×8 unit information map 232 has 8×8 areas. The 16×16 unit information map 233 has 4×4 areas. The 32×32 unit information map 234 has 2×2 areas. Note that, however, in FIG. 4, all areas are not illustrated, but some areas are illustrated.

A reflecting circuit 22 includes an AND circuit 221 and an inverter 225. The AND circuit 221 inputs data in a certain area of the 4×4 unit information map 211 in the process completion map 21 via the inverter 225. Furthermore, the AND circuit 221 inputs data in areas (for example, five areas around the certain area) corresponding to a block having dependence with the block corresponding to the certain area. In addition, the output of the AND circuit 221 is connected to the dependence dissolution map 23 so that data is set in the area of the 4×4 unit information map 231 in the dependence dissolution map 23, the area corresponding to the certain area of the 4×4 unit information map 211 in the process completion map 21.

Similarly, the AND circuit 222 in the reflecting circuit 22 inputs data in a certain area of the 8×8 unit information map 212 in the process completion map 21 via an inverter (not illustrated in FIG. 4). Furthermore, the AND circuit 222 inputs data in areas corresponding to a block having dependence with the block corresponding to the certain area. Then, the output of the AND circuit 222 is connected to the dependence dissolution map 23 so that data is set in the area of the 8×8 unit information map 232 in the dependence dissolution map 23, the area corresponding to the certain area of the 8×8 unit information map 212 in the process completion map 21.

Moreover, the AND circuit 223 in the reflecting circuit 22 inputs data in a certain area of the 16×16 unit information map 213 in the process completion map 21 via an inverter (not illustrated in FIG. 4). Furthermore, the AND circuit 223 inputs data in areas corresponding to a block having dependence with the block corresponding to the certain area. Then, the output of the AND circuit 223 is connected to the dependence dissolution map 23 so that data is set in the area of the 16×16 unit information map 233 in the dependence dissolution map 23, the area corresponding to the certain area of the 16×16 unit information map 213 in the process completion map 21.

Furthermore, the AND circuit 224 in the reflecting circuit 22 inputs data in a certain area of the 32×32 unit information map 214 in the process completion map 21 via an inverter (not illustrated in FIG. 4). Furthermore, the AND circuit 224 inputs data in areas corresponding to a block having dependence with the block corresponding to the certain area. Then, the output of the AND circuit 224 is connected to the dependence dissolution map 23 so that data is set in the area of the 32×32 unit information map 234 in the dependence dissolution map 23, the area corresponding to the certain area of the 32×32 unit information map 214 in the process completion map 21.

As described above, upon the completion of process of the TU, the controller 10 sets data in a corresponding location in the 4×4 unit information map 211 of the process completion map 21 to 1. When "1" is set in a plurality of predetermined locations in the 4×4 unit information map 211, the AND circuit 221 causes data in the predetermined locations in the dependence dissolution map 23 to be set to "1." In the example illustrated in FIG. 4, focusing on an area A, data (data in an area corresponding to the area A) in the dependence dissolution map 23 is set to "1" which indicates that the dependence disappears when data in five areas (areas corresponding to blocks having the dependence) around the area A is set to "1," in other words, when the process of the blocks is completed.

Furthermore, also regarding the 8×8 blocks, 16×16 blocks, and 32×32 blocks, data in the corresponding area in the dependence dissolution map 23 is set to "1" which indicates that the dependence disappears when data in the areas (areas corresponding to blocks having the dependence) around the area corresponding to the TU for which process is not completed yet is set to "1," in other words, when the process of the blocks is completed in the 8×8 unit information map 212, the 16×16 unit information map 213, and the 32×32 unit information map 214 of the process completion map 21.

Upon occurrence of an area in which data is changed from "0" to "1" in the dependence dissolution map 23, the controller 10 instructs the processing unit 30 to start the process of the block (TU) corresponding to the area.

Figure 5:
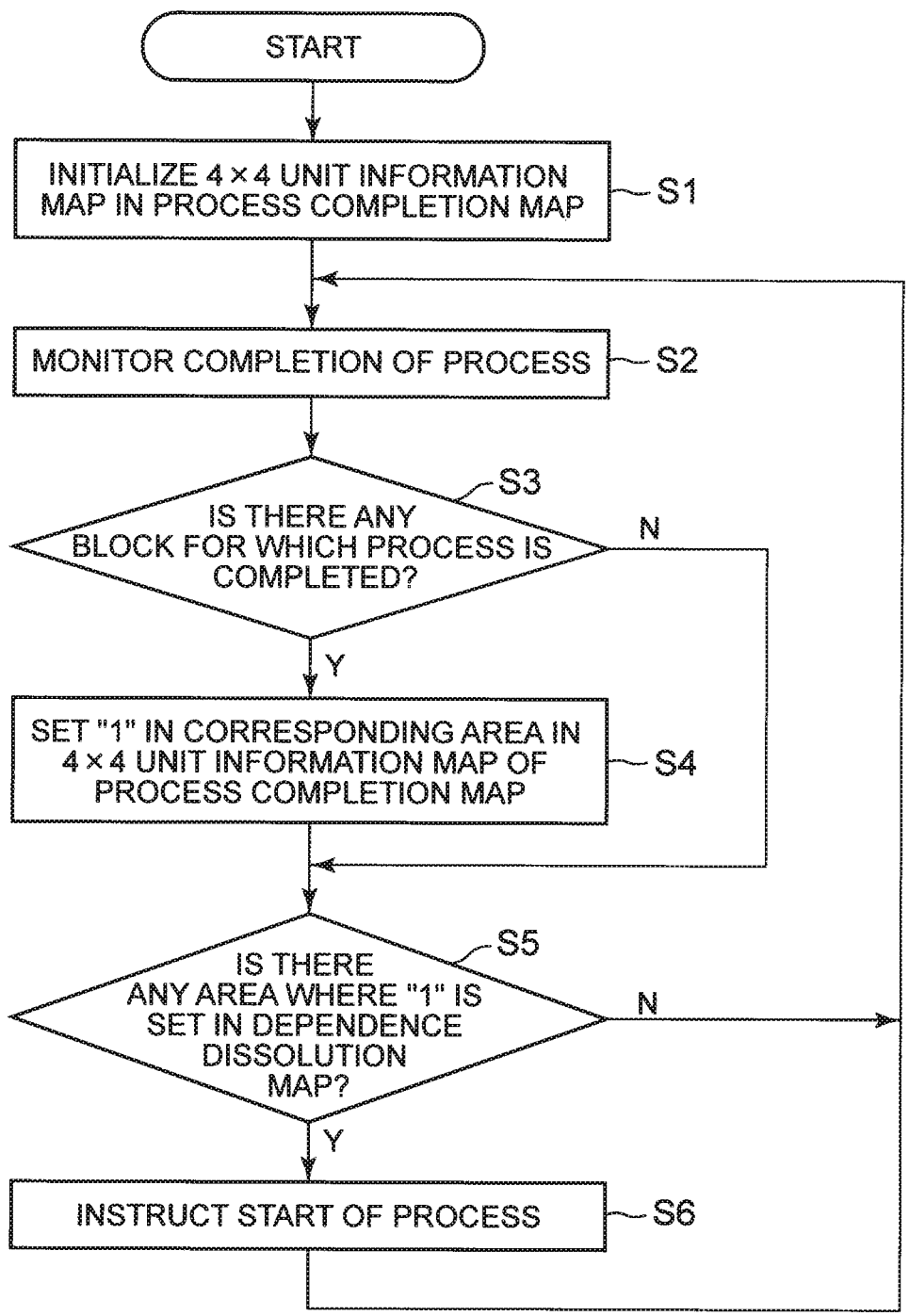
FIG. 5 is a flowchart illustrating an operation of a control circuit.

Referring to FIG. 5, the following describes the operation of the controller 10. FIG. 5 is a flowchart illustrating the operation of the controller 10.

The controller 10, first, initializes each area of the 4×4 unit information map 211 in the process completion map 21 to "0" (step S1).

Then, the controller 10 monitors whether or not the process performed by the processing unit 30 has been completed (step S2).

If there is a block for which process is completed (step S3), the controller 10 sets "1" in the area corresponding to the process in the 4×4 unit information map 211 of the process completion map 21 (step S4). As described above, the information set in the 4×4 unit information map 211 of the process completion map 21 is transmitted to the 8×8 unit information map 212, the 16×16 unit information map 213, and the 32×32 unit information map 214.

Moreover, the controller 10 checks whether there is an area where "1" is set in any of the unit information maps in the dependence dissolution map 23 (step S5). The area where "1" is set indicates that the corresponding process is ready to be performed. If the process is processing to be performed next, the controller 10 instructs the processing unit 30 to start to perform the process (step S6). Incidentally, in the case where the processing control device is applied to a video coding device, the process ready to be performed need not be performed in some cases according to the way of the CU and TU division.

As described hereinabove, in this exemplary embodiment, there are provided the process completion map 21 which is a map corresponding to processing units of the respective sizes, and in which, when process corresponding thereto is completed, setting indicating the completion of the process is performed and the dependence dissolution map 23 which is a map corresponding to the processing units of the respective sizes and in which information indicating that the dependence of each process disappears is set, and when detecting that the process is completed, the controller 10 sets information indicating that the process is completed in an area corresponding to the process within a minimum size of map (the 4×4 unit information map 211) in the process completion map 21, and the reflecting circuit 22 reflects the information set in the process completion map 21 in the dependence dissolution map 23, thereby enabling dependence control to be performed with a simple configuration.

Moreover, the controller 10 is able to determine whether the process is ready to be performed regarding blocks of all sizes only by setting data in the 4×4 unit information map 211 in the process completion map 21, thereby enabling dependence control to be performed rapidly with a simple configuration.

In the above exemplary embodiment, the processing control method is performed in the processing control device with a hardware circuit. The processing control method, however, is also able to be implemented by software. Specifically, the process completion map 21 and the dependence dissolution map 23 described above are allowed to be implemented by a storage unit (a register or a memory) and a central processing unit (CPU) which performs a process according to a program (particularly, performs a process corresponding to the function of an AND circuit) in an information processing device such as a computer including the CPU, so that the controller 10 and the reflecting circuit 22 are implemented by the CPU which performs a process according to the program.

Figure 6:
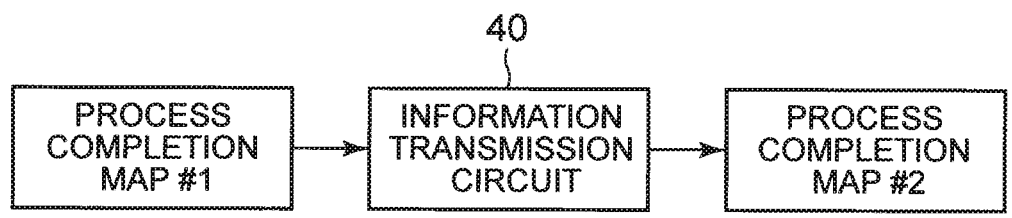
FIG. 6 is a block diagram illustrating the configuration of a processing control circuit including an information transmission circuit.
Figure 7:
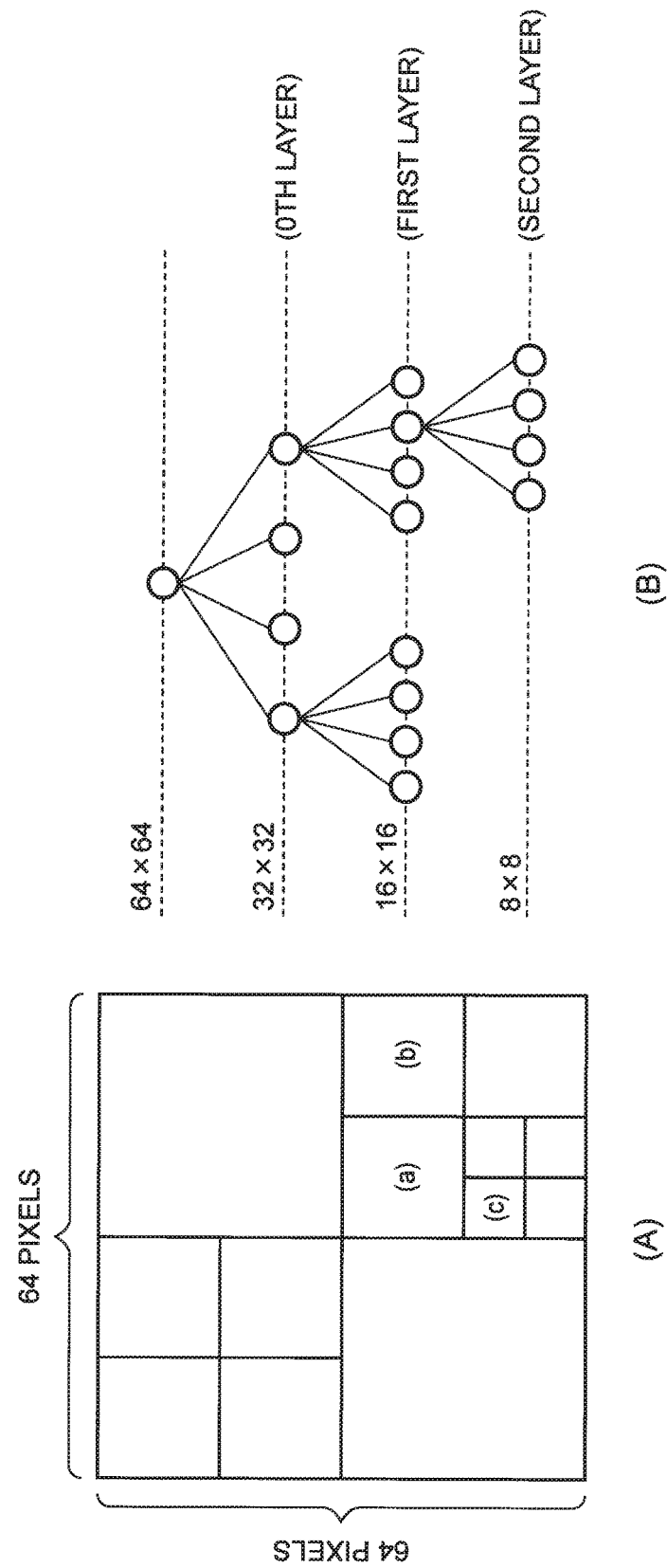
FIG. 7 is an explanatory diagram illustrating a CU division example.

As illustrated in FIG. 2, the processing control device according to the present invention includes: the process completion map 21 which is a map corresponding to processing units of the respective sizes (for example, a single unit includes 4×4, 8×8, 16×16, or 32×32 pixels), and in which, when the process corresponding thereto is completed, setting indicating the completion of the process is performed; the dependence dissolution map 23 which is a map corresponding to the processing units of the respective sizes and in which information indicating that the dependence of each process disappears is set; the controller 10 which, when the process is completed, sets information indicating that the process is completed in an area corresponding to the process within a small size of map (for example, the 4×4 unit information map 211 having the minimum size) in the process completion map 21; and the reflecting circuit 22 which reflects the information set in the process completion map 21 in the dependence dissolution map 23. As illustrated in FIG. 6, however, the processing control device may further include an information transmission circuit 40 which sets information indicating whether or not the corresponding process is completed based on the information set in the process completion map #1 (for example, the 4×4 unit information map 211 for 8×8, the 8×8 unit information map 212 for 16×16, or the 16×16 unit information map 213 for 32×32) corresponding to the processing unit of a small size into the process completion map #2 (for example, the 8×8 unit information map 212 for 4×4, the 16×16 unit information map 213 for 8×8, or the 32×32 unit information map 214 for 16×16) corresponding to the processing unit of a large size including the processing unit of the small size.

The information transmission circuit 40 is implemented by AND circuits 215, 216, and 217 in the configuration illustrated in FIG. 4.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

This application claims priority to Japanese Patent Application No. 2013-204865 filed on Sep. 30, 2013, and the entire disclosure thereof is hereby incorporated herein by reference.

REFERENCE SIGNS LIST 10 controller
20 mapping unit
21 process completion map
22 reflecting circuit
23 dependence dissolution map
30 processing unit
31 to 36 block
211 4×4 unit information map
212 8×8 unit information map
213 16×16 unit information map
214 32×32 unit information map
231 4×4 unit information map
232 8×8 unit information map
233 16×16 unit information map
234 32×32 unit information map
301 transformer
302 quantizer
303 entropy encoder
304 inverse quantizer/inverse transformer
305 buffer
306 prediction unit
307 optimal prediction mode decision unit

The invention claimed is:
1. A processing control device for determining that dependence of one process with the other process disappears, wherein:
the process is performed with any one of processing units of a plurality of sizes as a unit; and
a processing unit of a small size among the processing units of the plurality of sizes is included in a processing unit of a large size,
the processing control device comprising:
a process completion map which is a map corresponding to the processing units of the respective sizes, and in which, when the process corresponding thereto is completed, setting indicating completion of the process is performed;

a dependence dissolution map which includes maps corresponding to the processing units of the respective sizes and in which information indicating that the dependence of each process disappears is set;

a controller which, when the process is completed, sets information indicating that the process is completed in an area corresponding to the process within the small size of map in the process completion map; and a reflecting circuit which reflects the information set in the process completion map in the dependence dissolution map.

2. The processing control device according to claim 1, wherein the reflecting circuit sets information indicating that the dependence disappears in an area corresponding to one process in the dependence dissolution map when the information indicating completion is set in the areas corresponding to all processes having the dependence with the one process in the process completion map.

3. The processing control device according to claim 1, further comprising an information transmission circuit which sets information indicating whether or not the corresponding process is completed based on the information set in the process completion map corresponding to the processing unit of a small size in the process completion map corresponding to the processing unit of a large size including the processing unit of the small size.

4. The processing control device according to claim 1, wherein the size of a processing unit is a TU size based on HEVC.

5. The processing control device according to claim 2, further comprising an information transmission circuit which sets information indicating whether or not the corresponding process is completed based on the information set in the process completion map corresponding to the processing unit of a small size in the process completion map corresponding to the processing unit of a large size including the processing unit of the small size.

6. The processing control device according to claim 2, wherein the size of a processing unit is a TU size based on HEVC.

7. The processing control device according to claim 3, wherein the size of a processing unit is a TU size based on HEVC.

8. A processing control method for determining that dependence of one process with the other process disappears, wherein:

the process is performed with any one of processing units of a plurality of sizes as a unit;

a processing unit of a small size among the processing units of the plurality of sizes is included in a processing unit of a large size;

when one process is completed, information indicating that the process is completed is set in an area corresponding to the process within the small size of map in the process completion map corresponding to the processing units of the respective sizes; and the information set in the process completion map is reflected on the dependence dissolution map which includes maps corresponding to the processing units of the respective sizes and in which information indicating that the dependence of each process disappears is set.

9. The processing control method according to claim 8, wherein information indicating that the dependence disappears is set in an area corresponding to one process in the dependence dissolution map when the information indicating completion of process is set in the areas corresponding to all processes having the dependence with the one process in the process completion map.

10. The processing control method according to claim 8, wherein information indicating whether or not the corresponding process is completed is set based on the information set in the process completion map corresponding to the processing unit of a small size in the process completion map corresponding to the processing unit of a large size including the processing unit of the small size.

11. The processing control method according to claim 8, wherein the size of a processing unit is a TU size based on HEVC.

12. The processing control method according to claim 9, wherein information indicating whether or not the corresponding process is completed is set based on the information set in the process completion map corresponding to the processing unit of a small size in the process completion map corresponding to the processing unit of a large size including the processing unit of the small size.

13. The processing control method according to claim 9, wherein the size of a processing unit is a TU size based on HEVC.

14. The processing control method according to claim 10, wherein the size of a processing unit is a TU size based on HEVC.

15. A non-transitory computer readable information recording medium storing a processing control program for determining that dependence of one process with the other process disappears, wherein:

the process is performed with any one of processing units of a plurality of sizes as a unit;

a processing unit of a small size among the processing units of the plurality of sizes is included in a processing unit of a large size, the processing control program performs when executed by a processor:

setting information indicating that the process is completed in an area corresponding to the process within the small size of map in the process completion map corresponding to the processing units of the respective sizes when one process is completed; and reflecting the information set in the process completion map on the dependence dissolution map which is a map corresponding to the processing units of the respective sizes and in which information indicating that the dependence of each process disappears is set.

16. The information recording medium according to claim 15, when executed by the processor, the processing control program performs setting information indicating that the dependence disappears in an area corresponding to one process in the dependence dissolution map when the information indicating completion of process is set in the areas corresponding to all processes having the dependence with the one process in the process completion map.

17. The information recording medium according to claim 15, when executed by the processor, the processing control program performs setting information indicating whether or not the corresponding process is completed based on the information set in the process completion map corresponding to the processing unit of a small size in the process completion map corresponding to the processing unit of a large size including the processing unit of the small size.

18. The information recording medium according to claim 15, wherein the size of a processing unit by which the processor performs processing is a TU size based on HEVC.

19. The information recording medium according to claim 16, when executed by the processor, the processing control program performs setting information indicating whether or not the corresponding process is completed based on the information set in the process completion map corresponding to the processing unit of a small size in the process completion map corresponding to the processing unit of a large size including the processing unit of the small size.

20. The information recording medium according to claim 16, wherein the size of a processing unit by which the processor performs processing is a TU size based on HEVC.

* * * * *